(No Model.)

O. KRAUS.
SELF OILING HUB FOR BICYCLES.

No. 553,621. Patented Jan. 28, 1896.

WITNESSES:
Chas. W. Thomas
Fried Correll

INVENTOR:
Otto Kraus
BY
A. Faber du Faur.
ATTORNEY

UNITED STATES PATENT OFFICE.

OTTO KRAUS, OF NEW YORK, N. Y., ASSIGNOR TO THE R. H. WOLFF & COMPANY, LIMITED, OF NEW YORK.

SELF-OILING HUB FOR BICYCLES.

SPECIFICATION forming part of Letters Patent No. 553,621, dated January 28, 1896.

Application filed August 18, 1894. Serial No. 520,707. (No model.) Patented in England December 17, 1894, No. 24,533, and in France December 18, 1894, No. 243,754.

*To all whom it may concern:*

Be it known that I, OTTO KRAUS, a subject of the Emperor of Austria-Hungary, and a resident of New York, in the county and State of New York, have invented certain new and useful Improvements in Self-Oiling Hubs for Bicycles, (for which Letters Patent have been obtained in Great Britain, No. 24,533, dated December 17, 1894, and in France, No. 243,754, dated December 18, 1894,) of which the following is a specification.

My invention has reference to improvements in hubs for bicycle and other vehicle wheels; and it has for its object to provide means for insuring a steady and liberal supply of lubricant to the bearings for a considerable length of time without replenishing.

The nature of my invention will best be understood when described in connection with the accompanying drawings, in which—

Figure 1:
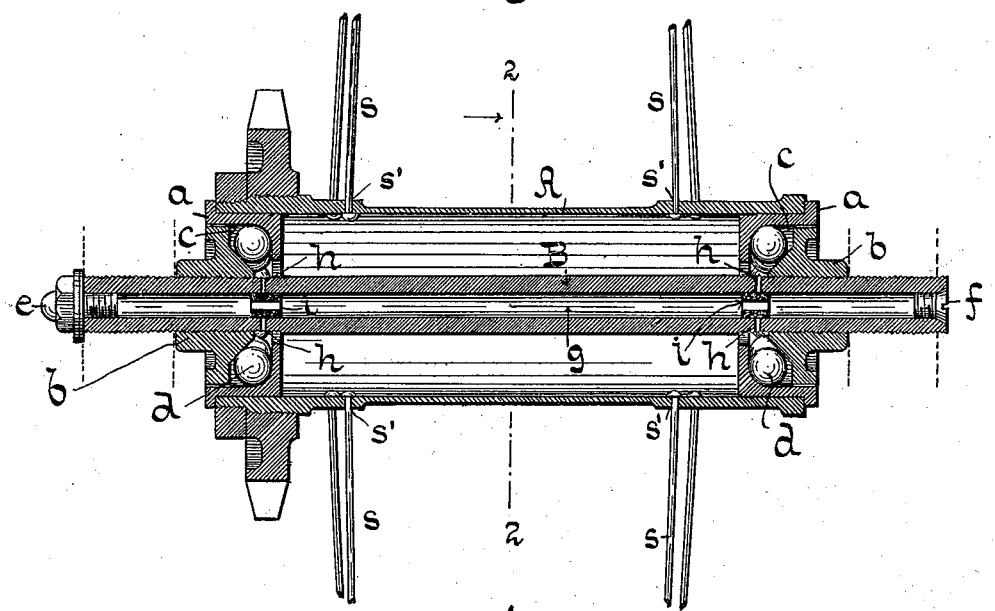
Figure 2:
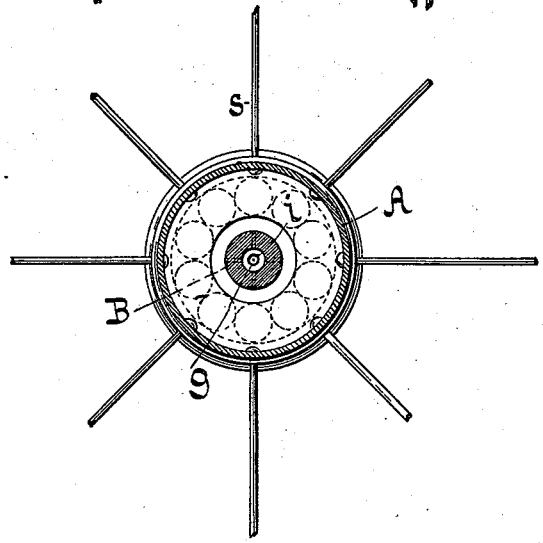

Figure 1 represents a sectional elevation of a hub adapted for a bicycle-wheel. Fig. 2 is a vertical section in the plane 2 2, Fig. 1.

Similar letters of reference designate corresponding parts.

Referring to the drawings, the letter A designates a cylindrical hub provided with annular caps $a$ $a$, brazed or otherwise secured thereto. Into these caps project heads $b$ $b$, screwed on the axle B and forming with said caps annular chambers $c$ $c$, in which the balls $d$ are placed, as usual. The spokes $s$ of the wheel are inserted into the hub through the open ends of the same and passed through peripheral openings $s'$.

The axle B is in the form of a tube closed at opposite ends by screw-plugs $e$ and $f$ or other suitable means. The longitudinal chamber $g$ thus formed within the axle communicates with the annular chambers $c$ $c$ containing the balls through radial passages $h$. The lubricant in chamber $g$ passes through these passages to the ball-chamber $c$ and keeps the bearings thoroughly lubricated. To prevent excessive flow of lubricant the passages are obstructed by hollow plugs $i$, of felt or other porous material.

If desired, the chamber may also be partly filled with cotton-waste or like material.

The lubricant is introduced into chamber $g$ by removing the plug $e$.

By the construction above described a steady supply of lubricant to the bearings, lasting from two to three months, is insured, while all the parts are practically dust-proof. Furthermore, in view of the axle being closed at both ends by removable plugs, the lubricant-chamber can be thoroughly cleansed when necessary, which is not the case when one end of the axle is permanently closed. Such an axle can also be more cheaply produced.

In the hubs heretofore known special enlargements were provided in all cases to enable the spokes, of which there are usually from twenty-eight to thirty-two, to be secured thereto. According to my invention I make the hub of sufficient size to receive the spokes and make it of uniform diameter, whereby the cost of manufacture is considerably reduced and greater strength and better bearings are obtained.

What I claim as new is—

In a velocipede, the combination of a tubular axle forming a lubricant chamber, removable plugs closing the opposite ends of said axle, heads $b$ $b$ threaded on the axle near its opposite ends, a tubular hub, caps $a$ $a$ secured in the ends of the hub and forming annular ball chambers in connection with the heads $b$ $b$ and balls in said chambers; said axle being provided with radial passages leading directly to said ball chambers, and annular plugs of porous material placed within the axle over said passages, substantially as and for the purpose set forth.

In testimony that I claim the foregoing as my invention I have signed my name, in presence of two witnesses, this 26th day of July, 1894.

OTTO KRAUS.

Witnesses:
THOS. V. HANDLOSER,
J. H. FRANKFURTER.